UNITED STATES PATENT OFFICE.

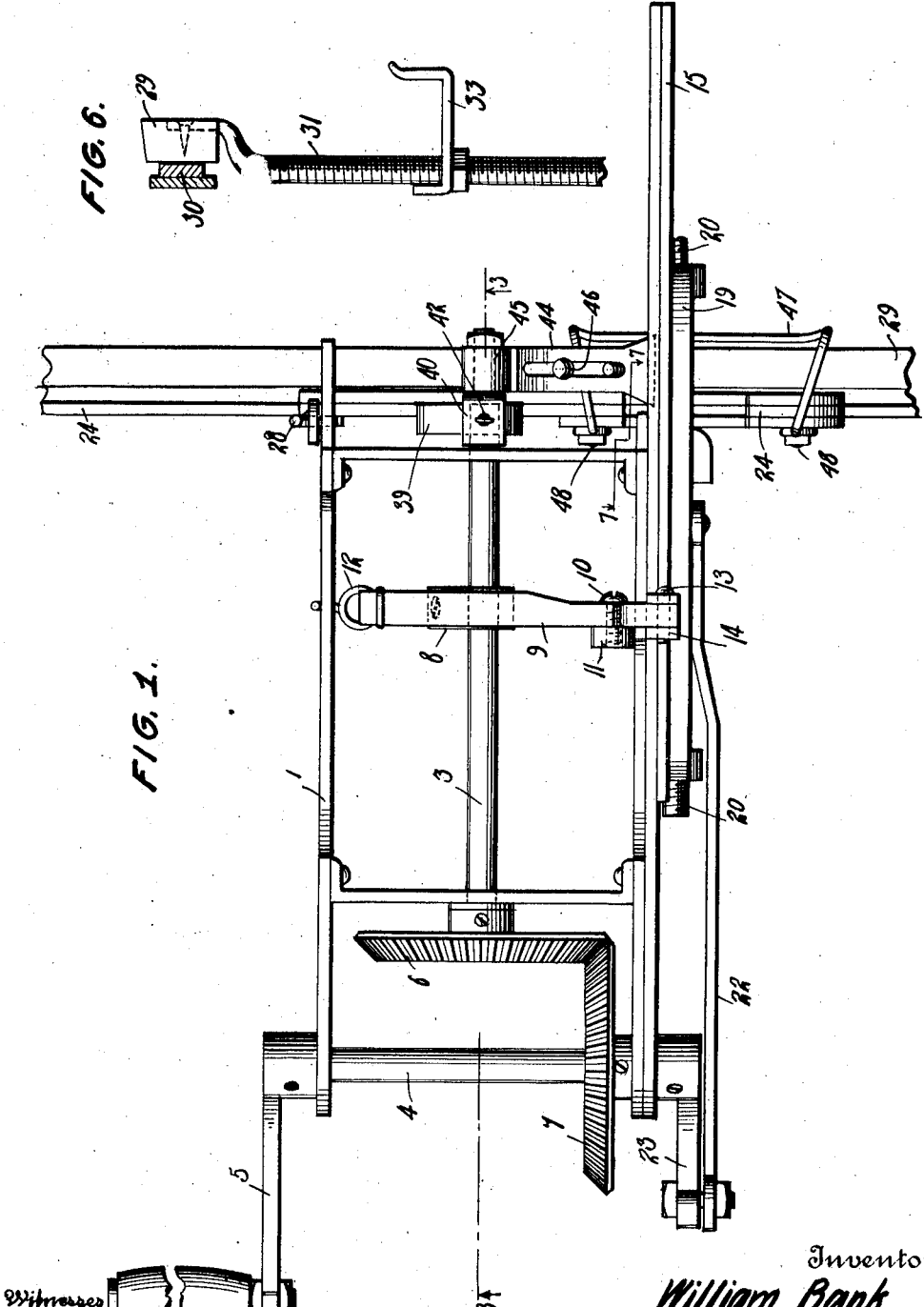

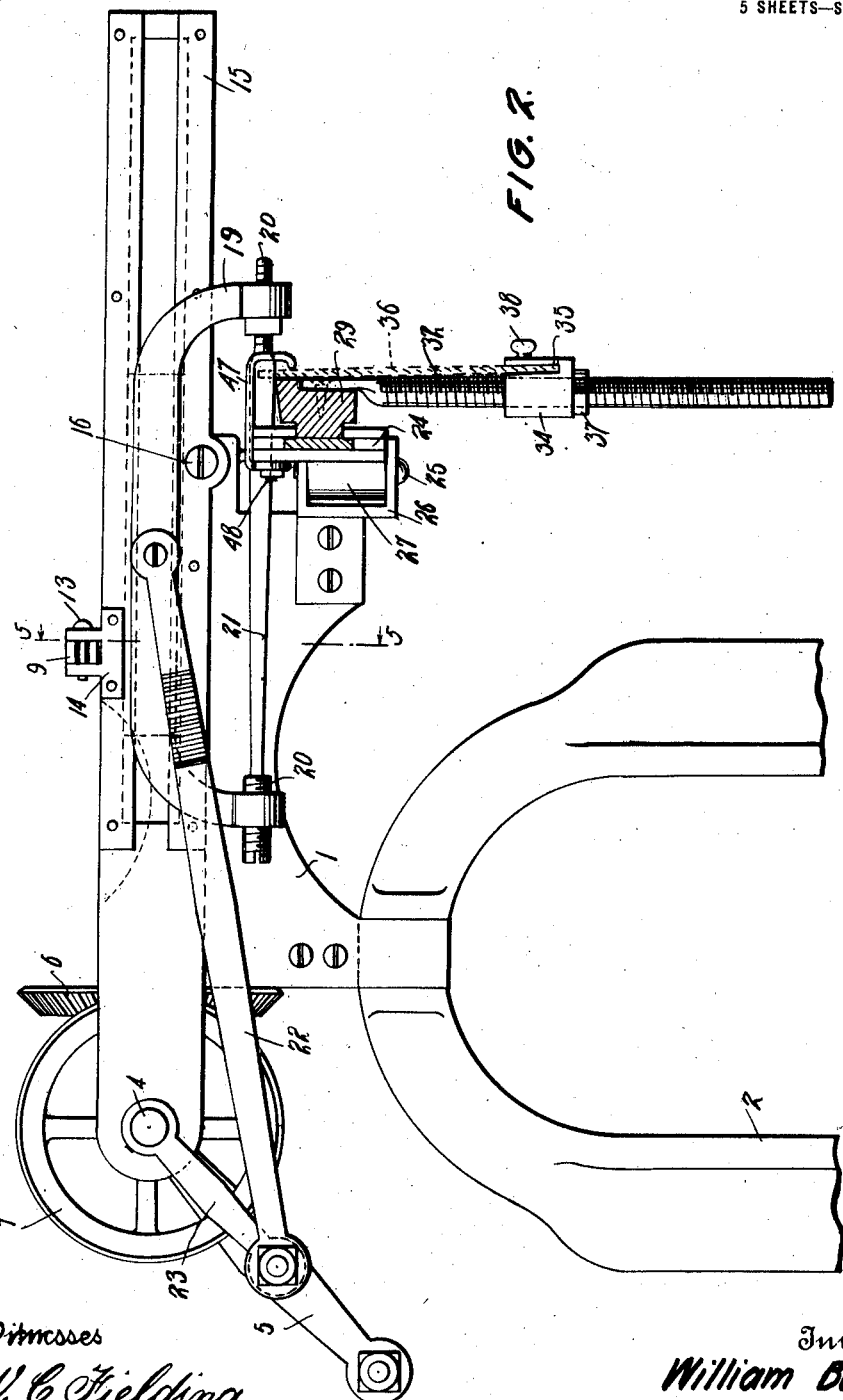

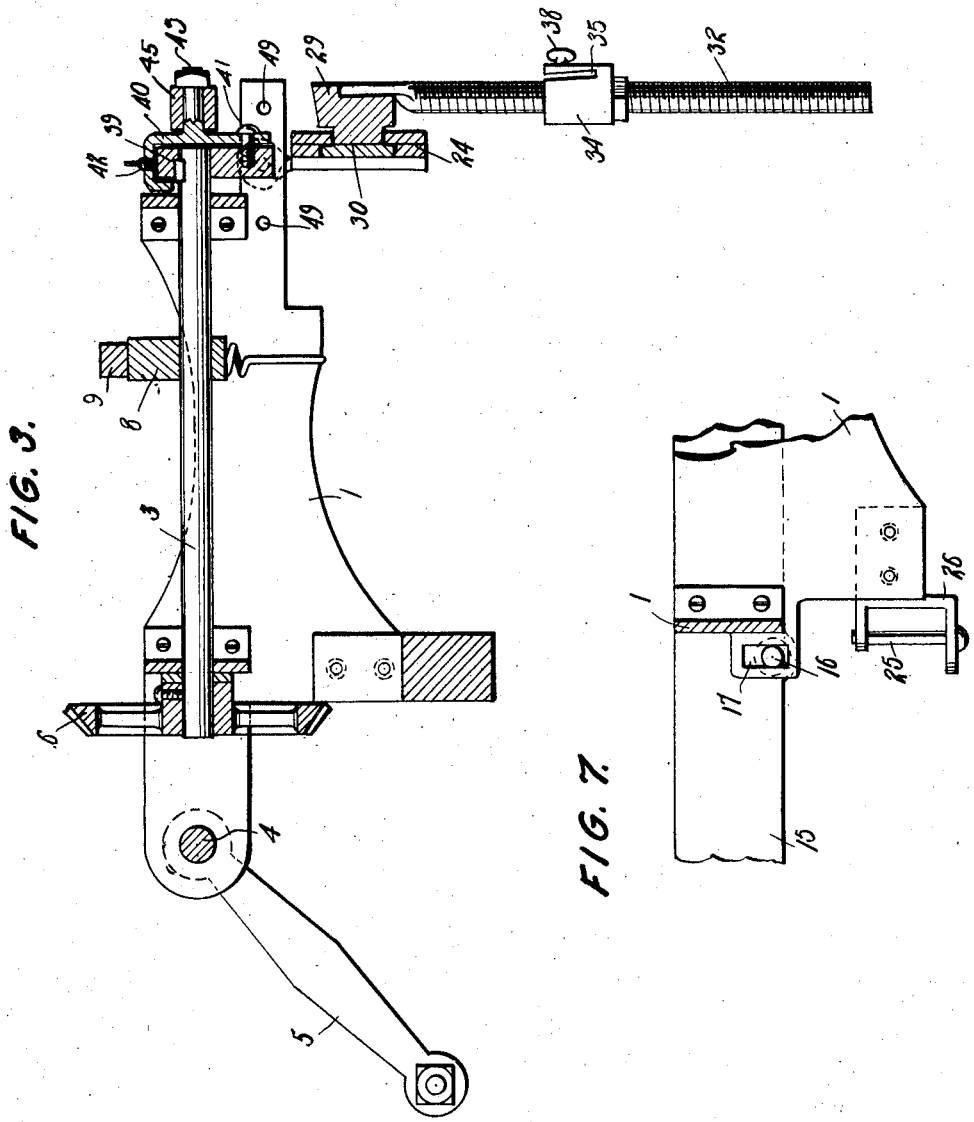

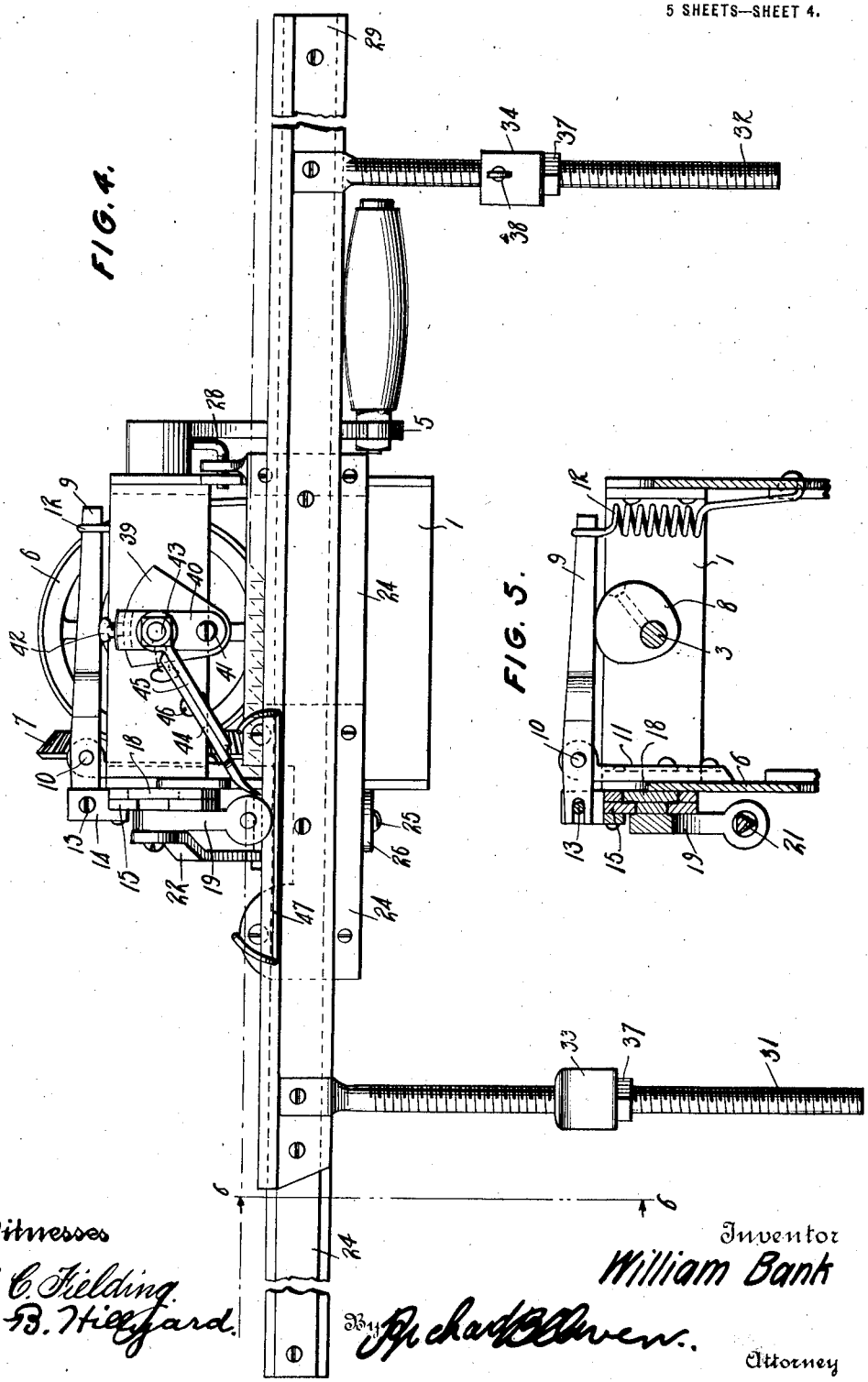

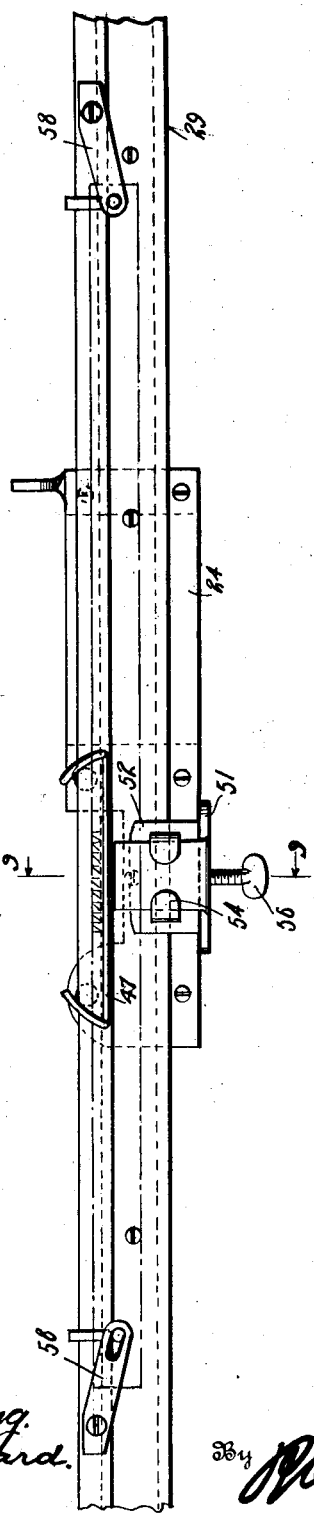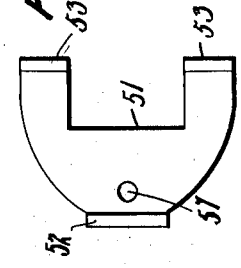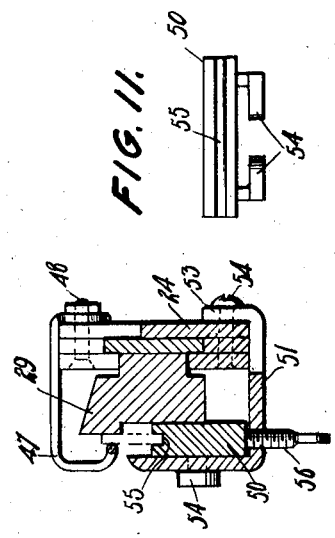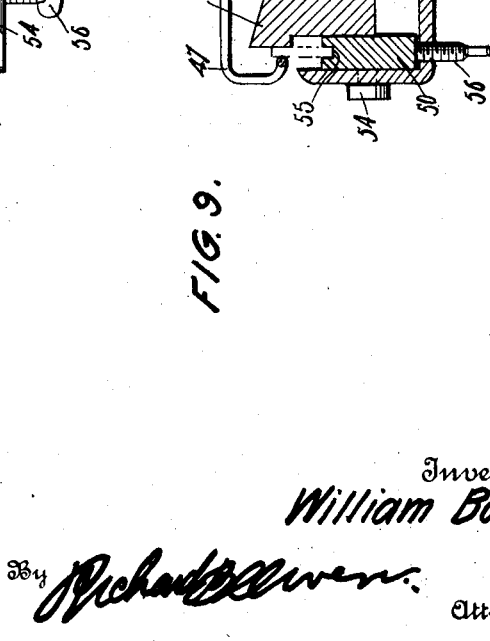

WILLIAM BANK, OF CHICAGO, ILLINOIS.

SAW-FILING MACHINE.

1,339,153. Specification of Letters Patent. Patented May 4, 1920.

Application filed March 13, 1919. Serial No. 282,252.

*To all whom it may concern:*

Be it known that I, WILLIAM BANK, a citizen of the United States, residing at Chicago, in the county of Cook and State of Illinois, have invented certain new and useful Improvements in Saw-Filing Machines, of which the following is a specification.

The present invention relates to a machine for filing the teeth of saws, the purpose being the provision of a machine which is adaptable according to the number of teeth to the inch and the required nature of filing.

The invention provides a machine of the character and for the purpose stated which after being set and the saw to be sharpened placed in position is wholly automatic in operation both as regards the filing of the teeth and the feeding of the saw as the sharpening of the teeth progresses.

The invention furthermore aims to provide a machine which is adapted for sharpening the teeth of different makes and types of saws whether the blade be wide or narrow and whether the teeth are straight across or beveled.

The invention furthermore provides a machine which imparts a two-fold movement to the file, the one being reciprocatory and the other of a lifting nature so as to cause the file to clear the saw when moving backward to a starting position.

The invention also aims to provide a machine which admits of the feeding of the saw being regulated according to the number of teeth to the inch.

The drawings illustrate a preferred embodiment of the invention, however, it is to be understood that in adapting the same to meet different conditions, various changes in the form, proportion and minor details of construction may be resorted to, without departing from the nature of the invention as claimed hereinafter.

In the drawings:—

Figure 1 is a top plan view of the saw filing machine embodying the invention, end portions of the guide for the saw holder being broken away, Fig. 2 is a front view, a portion of the frame being broken away and the saw guide being in section, Fig. 3 is a longitudinal section on the line 3—3 of Fig. 1 looking into the direction of the arrows, Fig. 4 is an end view, the supporting frame-work being omitted and portions of the guide for the saw holder being broken away, Fig. 5 is a sectional detail on the line 5—5 of Fig. 2, Fig. 6 is a sectional detail of the saw guide and saw holder on the line 6—6 of Fig. 4, Fig. 7 is a sectional detail on the line 7—7 of Fig. 1, Fig. 8 is a detail view in elevation of a modification, Fig. 9 is a sectional detail on the line 9—9 of Fig. 8, Fig. 10 is a top plan view of the bracket for receiving the adjustable block which supports a narrow saw blade, and Fig. 11 is a top plan view of the adjustable block.

Corresponding and like parts are referred to in the following description and indicated in the several views of the drawings by like reference characters.

The numeral 1 designates the main frame of the machine which may be of any desired construction to receive and support the working parts. This frame is adapted to be supported upon a suitable stand 2, a portion of which is indicated in Fig. 2 and which is omitted in the remaining views. It is observed that the main frame 1 may be supported in any manner best adapted to meet existing conditions.

A longitudinally disposed shaft 3 is suitably mounted on the frame 1 and is geared to a suitably mounted transversely arranged shaft 4, the latter being preferably disposed at one end of the frame and adapted to be operated in any manner. As shown, a crank 5 is secured to one end of the transverse shaft 4 and provides means for operating such shaft by hand. While the two shafts 3 and 4 may be geared together, in any manner, it is preferred to attach a bevel gear 6 to one end of the longitudinal shaft 3 and to have the same mesh with a companion bevel gear 7 secured to the transverse shaft 4. A cam 8 is attached to the shaft 3 and is intended to impart an oscillatory movement to a transversely arranged lever 9 which is pivoted near one end as indicated at 10 to a bracket 11 fastened to the main frame 1. A contractile helical spring 12 is attached at one end to the long arm of the lever 9 and is made fast at its lower end to the main frame 1. This spring normally exerts a downward pull on the long arm of the lever 9 and holds it in contact with the cam 8. The outer or forward end of the lever 9 is attached to the guide upon which the file holder is slidably mounted. As indicated most clearly in Fig. 5 of the drawings, the outer or forward end of the lever 9 is bifurcated and engages the pin or fastening 13 which is supported at its end in a bracket 14 which is attached to the guide 15 which receives and supports the file holder.

The guide 15 is mounted so as to receive a vertical movement and as indicated the guide 15 is pivotally mounted upon an end portion of the shaft 4. A screw 16 or other type of fastening is fitted to the guide 15 and engages a vertically slotted portion 17 of the main frame, Fig. 7. The fastening 16 is located intermediate the end of the guide as shown most clearly in Fig. 2 and coöperates with the vertically slotted portion 17 of the main frame to prevent any appreciable lateral play of the guide 15 when the machine is in operation. The guide 15 consists of an elongated member which is slotted for the major portion of its length to receive a lateral extension 18 provided upon the back of the file holder 19, Fig. 5. The guide 15 may be of any construction and as indicated in Fig. 5 comprises a plurality of elements disposed in overlapping relation and suitably secured.

The file holder 19 consists of a bow-shaped frame. The back or longitudinal member of the frame 19 has a lateral offset portion 18, the top and bottom edges of which are channeled or grooved to receive portions of the guide 15 whereby the file holder is retained in position and properly directed in its reciprocatory movement. The ends of the file holder are provided with elements 20 which are threaded into openings formed therein. The elements 20 have openings formed in their inner ends to receive the extremities of a file 21 by means of which the saw is sharpened. In this manner, the file may be adjusted to any required position and is made fast by tightening either one or both of the elements 20. A pitman 22 connects the file holder 19 with a crank 23 at the end of the transverse shaft 4 opposite that provided with the operating crank 5. It will thus be understood that the file holder receives a combined vertical and longitudinal movement, the vertical movement being due to the oscillatory movement of the guide 15 and the longitudinal reciprocatory movement being due to the operation of the crank 23.

A saw guide 24 is disposed at one end of the main frame and is pivotally connected thereto at 25 by means of a bracket 26. The pivotal end of the saw guide is provided with a sleeve 27 through which a pivot pin 25 passes, the same constituting the means whereby the saw guide is pivotally connected to the main frame. A fastening 28 is mounted in a vertical extension of the saw guide 24 at the end opposite that pivotally connected to the main frame. The fastening 28 is adapted to engage a portion of the main frame so as to secure the saw guide in the required laterally adjusted position. When the fastening 28 is loosened, the movable end of the saw guide 24 may be swung laterally, thereby admitting of the angle of the saw guide to the guide 15 being changed according to the required bevel to be given the saw teeth when filing the same. After the saw guide 24 has been adjusted to the required position, it is made secure by tightening the fastening 28. The saw guide 24 may be of any construction and as indicated most clearly in Figs. 2 and 3, it is composed of a number of elements placed side by side.

The saw holder 29 is slidably mounted on the saw guide 24 and for this purpose has a lateral offset portion 30 which is grooved in its top and bottom edges to receive portions of the saw guide. Hangers 31 and 32 depend from opposite end portions of the saw holder and preferably consist of rods which are threaded in their length to receive supporting elements 33 and 34. The supporting element 33 consists of a bar having its end portions bent at a right angle and having an opening near one of the bent ends to receive the hanger 31. The element 33 is designed to receive the handle of a carpenter's or joiner's saw. The element 34 consists of a block in which is formed a kerf or slot 35 to receive the back portion of a saw 36, Fig. 2. The elements 33 and 34 are adjustable vertically on the hangers 31 and 32 by means of set nuts 37. The saw when placed in position has its toothed portion resting against the bar member of the holder 29 and its back engaging the elements 33 and 34, said saw being secured to the holder by means of a binding screw 38 fitted to the element 34.

The saw holder is required to be fed by a step by step movement as each tooth is filed and for this purpose advantage is taken of the teeth in conjunction with a pawl, the latter being adjustable. As shown most clearly in Figs. 3 and 4, the projecting end of the shaft 3 has a member 39 secured thereto and this member is preferably of quadrant shape. A member 40 is pivoted at its lower end to the member 39 as indicated at 41 and its upper end extends over the upper edge of the member 39 and is provided with a binding screw 42 whereby the member 40 may be secured in the required adjusted position. A pin 43 projects laterally from the member 40 and receives the feed pawl by means of which the saw is advanced during the sharpening process. Adjustment of the member 40 moves the pin 43 to a greater or less distance from the axis of the shaft 3 thereby regulating the movement of the feed pawl and the amount of movement of the saw at each advance operation. The pawl comprises two elements 44 and 45. The element 45 is mounted directly upon the pin 43 and the element 44 is adjustably connected with the element 45 and for this purpose is longitudinally slotted to receive a binding screw 46 threaded into the element 45. The feed pawl normally occupies an inclined position and its active end is broadened as indicated most clearly in Fig. 1 so as to make engagement with the teeth of the saw. In the operation of the machine, the end of the feed pawl rides upon the teeth of the saw when moving in a relative backward direction and upon the forward movement of the pawl its lower end engages a tooth of the saw and moves the latter and the saw holder forward so as to bring the next tooth in position to be sharpened.

The saw guide 24 may be of any relative length in order to provide a firm support for the saw holder 29 which may likewise be of any length. The toothed edge of the saw to be sharpened rests against the holder 29 and is retained in position thereagainst by means of a clip 47 which is attached to the saw guide about opposite the file holder. The saw retaining clip 47 is preferably constructed of stout wire which has its end portions bent vertically thence laterally and terminating in depending eyes which receive suitable fastenings 48 by means of which the clip is attached to the saw guide. The outer portion of the saw clip 47 overhangs the front side of the saw frame and engages the saw blade a distance below the teeth so as not to interfere with the free action of the file 21. The saw clip is adjusted so as to engage with the edge of the saw to retain the same in place without producing any binding action. It will thus be understood that the saw is permitted to move freely with reference to the saw clip, the latter being held stationary by reason of its connection to the fixed saw guide. In this connection it is to be understood that while the saw guide 24 is laterally adjustable to admit of filing the saw teeth to any bevel, the saw guide when so adjusted remains fixed. In this connection, attention is directed to a plurality of openings 49 formed in an extension of the main frame 1, Fig. 3. When the fastening 28 is engaged with the middle opening 49, the teeth of the saw are adapted to be filed square across. When the fastening 28 is engaged with an end opening 49, the teeth of the saw are adapted to be filed at a bevel, the direction of the latter depending upon which of the end openings 49, the fastening 28 is engaged with.

In the modification shown in Fig. 8, and the detail views thereof, the saw guide is indicated at 24 and the saw holder at 29, the latter being mounted upon the guide substantially as indicated in the cross sectional view, Fig. 9. A block 50 is supported by means of the saw guide through the instrumentality of a bracket 51, the latter consisting of a base portion having upwardly extending parts 52 and 53, the latter being apertured to receive fastenings 54 by means of which the bracket 51 is attached to the saw guide. The vertical extension 52 receives inwardly facing lugs 54 provided upon the outer face of the block 50. The upper edge of the block 50 has a longitudinal groove 55 to receive the back of a narrow saw blade such as generally used by meat cutters. The block 50 may be adjusted vertically by means of a set screw 56 which is inserted in an opening 57 formed in the base of the bracket 51. A saw clip 47 substantially the same as the saw clip previously described is secured to the saw guide 24 and coöperates with the movable saw holder to retain the saw in proper position. Saw clamps 58 are applied to opposite ends of the saw holder to engage with and retain the saw in place during the filing of the teeth thereof. This form of saw holder and clamping means adapts the machine for sharpening the teeth of saws of the type generally used by butchers and meat cutters.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claims.

Having thus fully described my invention, what I claim as new and desire to secure by Letters Patent, is:—

1. In a saw filing machine, a main frame, a saw guide pivoted thereto, at one end to swing laterally, means at the opposite end of the frame for securing the saw guide in the adjusted position, a saw holder slidable on the guide, and means for feeding the saw.

2. In a saw filing machine, a main frame, a saw guide pivoted thereto to swing laterally, means for securing the saw guide in the adjusted position, a saw holder slidable on the guide, a saw feeding pawl comprising two elements relatively adjustable, and an adjustable actuating member for the said pawl.

3. In a saw filing machine, a saw holder, a rotary member, a member pivoted eccentrically to the rotary member, means for securing the pivoted member in the required adjusted position, and a pawl comprising relatively adjustable elements pivotally connected to the said pivoted member and adapted to have its throw regulated by adjustment thereof.

4. In a saw filing machine, a saw holder, a quadrant shaped rotary member, an adjustable member pivoted eccentrically to the rotary member and having an end engaging over the curved edge thereof and adapted to be secured thereto in an adjusted position, and a pawl comprising relatively adjustable elements pivoted to the said adjustable member.

5. In a saw filing machine, a main frame, a saw holder slidable on the frame, a file holder mounted on the frame and operable across the plane of the saw holder, a lever connected with the file holder and disposed at a right angle thereto, a shaft, connecting means between the shaft and file holder for reciprocating the latter, a cam secured to the pivot for oscillating the lever and imparting an up and down movement to the file holder, and a saw feeding pawl adjustably connected with the said shaft.

6. In a saw filing machine, a saw guide, a saw holder mounted upon the saw guide, a bracket connected with the saw guide, a saw supporting block adjustably mounted upon the said bracket and a saw clip attached to the saw guide and coöperating with the saw holder to retain the saw in proper position.

In testimony whereof I affix my signature in presence of two witnesses.

WILLIAM BANK.

Witnesses:
GEORGE W. BISCHOFF,
ROBERT J. DANGUL.